(12) United States Patent
Mack, II et al.

(10) Patent No.: US 6,510,325 B1
(45) Date of Patent: Jan. 21, 2003

(54) CONVERTIBLE PORTABLE TELEPHONE

(76) Inventors: Gawins A. Mack, II, 709 S. Mangonia Cir., West Palm Beach, FL (US) 33401; R. Eugenia Mack, 709 S. Mangonia Cir., West Palm Beach, FL (US) 33401

( * ) Notice: Subject to any disclaimer, the term of this patent is extended or adjusted under 35 U.S.C. 154(b) by 0 days.

(21) Appl. No.: 09/406,454

(22) Filed: Sep. 27, 1999

Related U.S. Application Data

(63) Continuation-in-part of application No. 08/639,838, filed on Apr. 19, 1996, now Pat. No. 5,991,637.

(51) Int. Cl.$^7$ ................................................. H04B 1/38
(52) U.S. Cl. ...................... 455/550; 455/90; 455/184.1; 455/188.1; 455/575; 348/14.01; 348/14.02
(58) Field of Search .................... 455/90, 150.1, 455/152.1, 161.1, 161.2, 185.1, 186.1, 188.1, 188.2, 550, 556, 557, 575, 184.1; 348/14.01, 14.02, 14.03, 14.04, 14.65; 340/7.1, 571, 583

(56) References Cited

U.S. PATENT DOCUMENTS

| | | | |
|---|---|---|---|
| 4,481,382 A | 11/1984 | Villa-Real ................. 179/2 EA |
| 4,591,661 A | 5/1986 | Benedetto et al. ........ 179/2 EA |
| 4,682,363 A | 7/1987 | Goldfarb et al. .............. 381/74 |
| 4,720,857 A | 1/1988 | Burris et al. ................. 379/430 |
| 4,882,745 A | 11/1989 | Silver ........................... 379/61 |
| 4,945,557 A | 7/1990 | Kaneuchi et al. ............. 379/67 |
| 4,949,374 A | 8/1990 | Ishii et al. ...................... 379/88 |
| 4,975,949 A | 12/1990 | Wimsatt et al. ............. 379/387 |
| 4,993,061 A | 2/1991 | Hsieh ........................... 379/61 |
| 5,042,063 A | 8/1991 | Sakanishi et al. ............. 379/88 |
| 5,113,428 A | 5/1992 | Fitzgerald ..................... 379/61 |
| 5,191,602 A | 3/1993 | Regen et al. .................. 379/58 |
| 5,243,640 A | 9/1993 | Hadley et al. ................. 379/59 |
| 5,345,602 A | * 9/1994 | Wiedemann et al. .... 455/186.1 |
| 5,359,647 A | 10/1994 | Regen et al. .................. 379/56 |
| 5,369,685 A | 11/1994 | Kero ............................. 379/67 |
| 5,426,689 A | 6/1995 | Griffith et al. ................. 379/58 |
| 5,526,406 A | 6/1996 | Luneau ......................... 379/61 |
| 5,583,965 A | 12/1996 | Douma et al. ............. 395/2.84 |
| 5,615,410 A | 3/1997 | DeMars ....................... 455/90 |
| 5,721,775 A | 2/1998 | Leifer ......................... 379/430 |
| 5,722,069 A | 2/1998 | Donner ....................... 455/418 |
| 6,125,289 A | * 9/2000 | Lee ............................. 455/575 |
| 6,137,525 A | * 10/2000 | Lee et al. ................. 455/14.02 |

FOREIGN PATENT DOCUMENTS

| | | | | |
|---|---|---|---|---|
| JP | 0097732 | * | 6/1982 | .............. 455/152.1 |
| JP | 0122310 | * | 5/1988 | .............. 455/152.1 |
| JP | 0060115 | * | 3/1989 | .............. 455/152.1 |

* cited by examiner

*Primary Examiner*—Nay Maung
(74) *Attorney, Agent, or Firm*—John C. Smith

(57) ABSTRACT

A communications and entertainment device in which a cellular telephone is unfolded to form a headset which allows the user to wear the headset in a manner similar to conventional telephone headsets. The device includes an AM/FM radio receiver. The subsystems are prioritized such that one system is automatically interrupted based on higher priority activity. A display unit allows the user to display graphic information such as facsimile data or other graphic information such as that obtained from computer networks. A speaker phone function allows the user to hear audio output while the user has the device folded into the portable telephone configuration and hand-held. An integrated camera allows the device to be used for video phone telephone calls. An integral GPS receiver is built into the device to allow the location of the device to be automatically determined. The GPS receiver can be used in conjunction with the video phone function if the device is stolen by capturing a picture of the thief while the thief is dialing the stolen telephone and relaying that information along with GPS position information to local police such that the thief may be more easily captured and the device recovered.

20 Claims, 11 Drawing Sheets

CONVERTIBLE PORTABLE TELEPHONE

CROSS-REFERENCE TO RELATED APPLICATIONS

This application is a continuation in part application of the commonly owned copending application entitled "INTEGRATED PASSIVE AND ACTIVE COMMUNICATION SYSTEM", filed Apr. 19, 1996, bearing U.S. Ser. No. 08/639,838 now U.S. Pat. No. 5,991,637 and naming Gawins A. Mack, II, and R. Eugenia Mack, the named inventors herein, as joint inventors, the contents of which is specifically incorporated by reference herein in its entirety.

BACKGROUND OF THE INVENTION

1. Technical Field

The present invention relates to the field of portable electronic devices. In particular, it relates to portable telephones which unfold for use as radio headset receivers, communications head sets, or portable terminals.

2. Background Art

Portable passive electronic devices such as an AM/FM radio or a cassette player are well known. Compact entertainment devices have been used by individuals desirous of having the availability of music while engaged in outdoor activities such as walking, jogging, etc. Early portable entertainment devices used a larger main unit with a radio receiver and/or tape player which attached to an individual's belt or clothing. These devices typically have a separate headset which is attached to the main unit via wires.

More recently, self contained headsets such as those typified by the "Walkman" (TM) headsets commercially available from SONY corporation have become popular. These units are lighter in weight than previous units. As a result, a user can comfortably wear this type of headset without the inconvenience of the heavier separately carried units discussed above. In particular, the user does not have to be concerned about accidentally becoming entangled with the headset wires, thereby disconnecting the headset.

Other portable active electronic devices such as cellular telephones, intercoms, walkie-talkie devices, CB radio, etc. are also well known. These devices allow a user the benefit of communicating while traveling or engaging in outdoor activities. These devices have many of the drawbacks of earlier entertainment devices in that they are inconvenient to carry. Further, when a user is engaged in outdoor activities such as jogging, walking, etc., it is inconvenient to use a portable communication device due to the necessity of having to first remove the portable entertainment units headset. Further, the additional weight and nuisance of carrying multiple devices discourages users from taking both types of devices.

While the ability to communicate often provides a user with convenience, it can also provide the user with an added element of security. For example, many individuals jog alone. As a result, they can be targets for assailants, they can become injured due to traffic accidents, or even become injured from the physical activity they are engaged in. The possession of a telephone while engaging in leisure activities such as jogging or while working outdoors can be useful for summoning help, and may be an important factor in the jogger obtaining timely help. Unfortunately, the inconvenience of carrying two separate systems while outdoors typically results in an individual choosing one type of device or another, but not both.

A factor in the overall bulk and inconvenience associated with carrying two types of systems is the redundant nature of many components in each system. For example, both a radio headset and a cellular telephone include speakers and audio circuitry, both may have LCD display panels and the associated driving circuitry, and both may have data entry devices such as keypads.

Another electronic convenience item that has been developed is the use of visual or graphic transmission devices, such as fax machines, PDAs (personal digital assistants), and hand-held portable computing devices capable of displaying graphics. While not requiring the ability to transmit or receive images on a frequent basis, it would be desirable to be able to transmit graphic information from a small portable device.

Another function provided by certain devices, such as notebook computers or PDAs has been the provision of calendar systems which track reminders and appointments for users. It would be desirable to have personal time tracking systems such as these conveniently packaged such that audio notices could be given to a user on an automatic basis.

An additional problem associated with portable electronic devices is their exposure to theft which is created by the convenience provided by their easy portability. In the past, the thief would be able to use a stolen cellular telephone until the telephone service was turned off by the local telephone company. Once the phone service was turned off for a particular cellular telephone, the thief would merely throw away the original stolen telephone and steal another one as a replacement. It would be desirable to have a method of locating a stolen telephone as soon as its possible to avoid further theft of services.

Today's consumer is presented with a wide variety of devices, each of which provides one or more functions. Unfortunately, the consumer who wishes to take advantage of a variety of these functions is disadvantaged by the inconvenience of having to carry multiple devices. The reason for this is the particular physical configurations that many portable electronic devices have.

A problem associated with all of the foregoing technologies is that various technologies have different functions, are not integrated, and they are configured in inconvenient physical packages which are difficult to carry or handle while performing other activities. It would be desirable to have a headset that would provide the convenience and comfort of hands free operations, along with audio/video communications.

While addressing the basic desirability of having access to entertainment and communications while outdoors, the prior art has failed to provide an integrated system which allows convenient access to both communications and entertainment in a single device, that allows a hand-held cellular telephone to be converted into both a headset and an audio video display. Further, the prior art has failed to provide for automatic user notification by the system for upcoming events or appointments.

SUMMARY OF THE INVENTION

The present invention solves the foregoing problems by providing a combined communications and entertainment device in which a hand-held portable telephone can be unfolded to form a headset which allows the user to wear the headset in a manner similar to conventional telephone headsets. In addition, the device includes passive communication devices, such as an AM/FM radio receiver, and a passive communications subsystem such as a pager. The subsystems are prioritized such that one system is automatically interrupted based on higher priority system activity. The AM/FM radio would be the lowest priority subsystem. It would be interrupted by activation of either the telephone function or the pager function. In the event that the telephone function or the pager function are simultaneously activated, the bidirectional (i.e. telephone) function would have priority over the unidirectional pager function which would store received data in storage and present the data to the user when the telephone function is deactivated. The device also includes a camera and display to allow use of the device for teleconferencing or as a video phone. A speaker phone function allows the user to hear audio output while the user has the device folded into the portable telephone configuration such that audio information can be heard while the user is holding the device in the user's hand and displaying video information from a caller or accessing graphic data from the Internet. An integral GPS receiver is built into the device to allow the location of the device to be automatically determined. The GPS receiver can be used in conjunction with the video phone function if the device is stolen by capturing a picture of the thief while the thief is dialing the stolen telephone and relaying that information along with GPS position information to local police such that the thief may be more easily captured and the device recovered.

DESCRIPTION OF THE PREFERRED EMBODIMENT

Figure 1A:
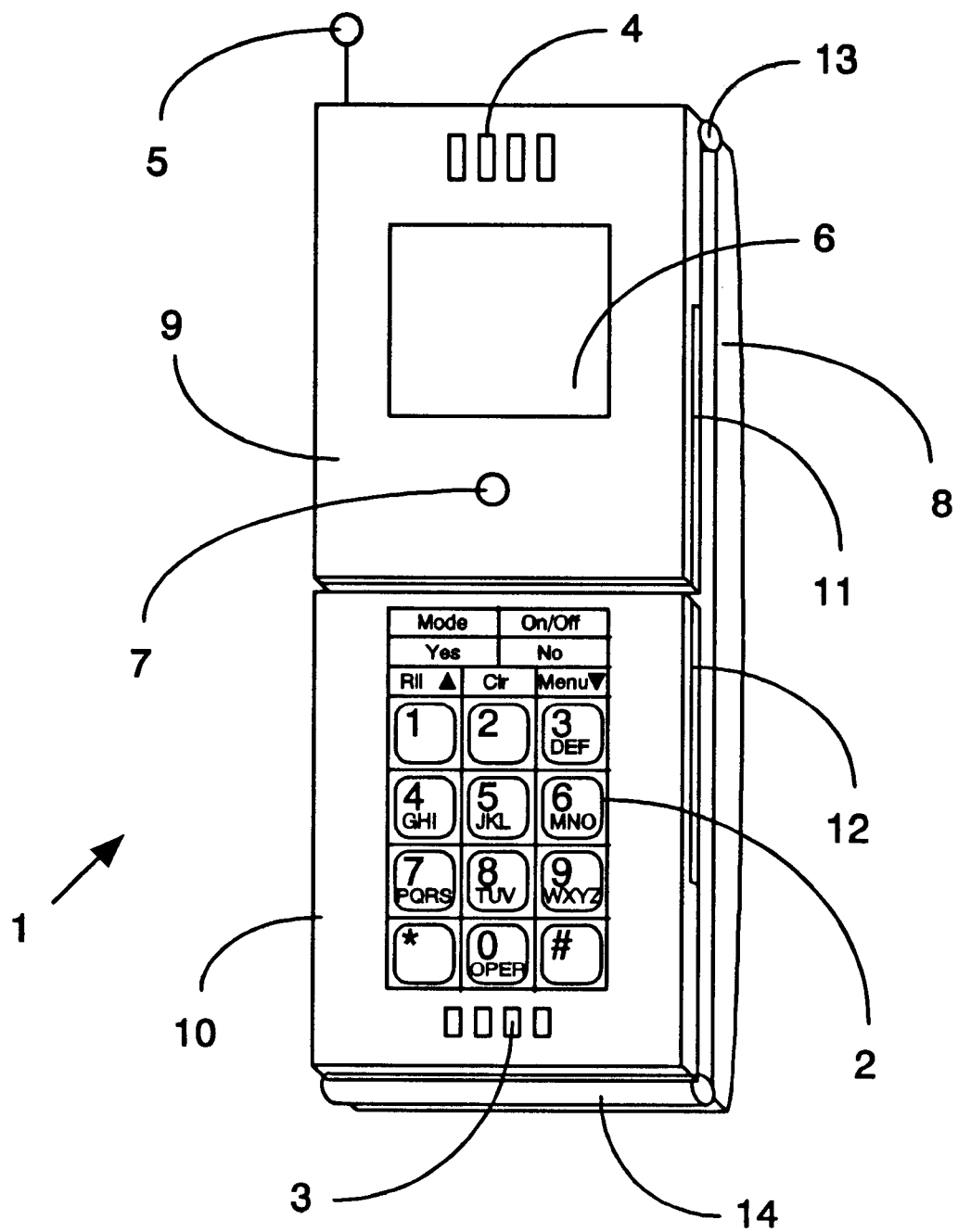
FIG. 1A illustrates a perspective view of a preferred embodiment illustrating the device in the folded configuration for use as a conventional cellular telephone.
Figure 1B:
FIG. 1B is a detailed view of the keypad used in the embodiment of figure 1A.
Figure 1B:

Referring to FIG. 1, this figure is a perspective view that illustrates a preferred embodiment of the portable communications device 1. In this figure, the device is shown in the folded position which would allow its use as a conventional cellular telephone. When in the folded position, an upper segment 9 is attached to a base segment 8 via an upper hinge 13, and a lower segment 10 is attached to the base segment 8 via a lower hinge 14. In the preferred embodiment, the upper hinge 13 and the lower hinge 14 are fabricated using helical springs (not shown) which provide a bias force to hold the portable communications device 1 in the folded position.

The portable communications device 1 is also shown with a keypad 2 located on the lower segment 10. The keypad 2 is discussed in greater detail in regard to FIG. 1B. Also shown on lower segment 10 is microphone 3 which is located below keypad 2.

Upper segment 9 includes several devices in the preferred embodiment. A speaker 4 is located at the top of upper segment 9. Below the speaker, a display 6 is shown. Conventional telephones typically use LCD (liquid crystal diode) displays for the presentation of numbers, caller ID, etc.. In the preferred embodiment, an active matrix display is used. The advantage of using an active matrix display is that in addition to presenting character information, an active matrix display can provide a full range of graphic information including video for a video phone use. To enable bidirectional video phone capability to be implemented on a cellular telephone, a camera 7 is also incorporated into the portable communications device 1 and located just below the display 6. In this figure, upper segment 9 is also shown in the folded position. An antenna 5 is shown extending from the upper segment 9. Also shown in this figure is an upper wing 11 which is attached to upper segment 9 and a lower wing 12 which is attached to lower segment 10. The upper wing 11 and lower wing 12 are not used in the folded configuration.

In the folded configuration, the portable communications device 1 is used as a conventional cellular telephone. In addition, the presence of the camera 7 at the display 6 allow the portable communications device 1 to be used as a via phone or to obtain and display graphics data from a computer (not shown). In order to allow effective use of the device as a video phone or terminal, the user would press the mode button on the keypad 2, step through the menu items and select video phone or terminal mode.

Those skilled in the art will recognize that in order to effectively use the portable communications device 1 as a video phone, or as a computer terminal, the portable communications device 1 must be positioned away from the user's head so that the camera 7 and display 6 can be effectively used. Therefore, when these modes are selected the portable communications device 1 automatically enables speaker phone mode by increasing the volume of speaker 4 and microphone 3.

While video phone capability is an attractive user option, the camera 7 also provides another important advantage. As mentioned previously, a significant problem associated with cellular telephones is related to their small size and the ease with which they can be stolen. In the preferred embodiment, the portable communications device 1 is designed to receive a command from the user in the event the portable communications device 1 is stolen. The command can be sent via DTMF signals, via separate RF signal which could be received by way of a separate internal RF receiver, via separate data signal inserted on the phone carrier, etc.. When the signal is received, the portable communications device 1 would then activate the camera 7 whenever the portable communications device 1 is dialed by the thief Since the camera is located directly above the keypad 2, when the thief is dialing the telephone the camera will be pointed directly at the thief. In the preferred embodiment, the camera 7 incorporates storage to hold an image of the thief. The thief attempts to call another number, the portable communications device 1 would dial a special number at the telephone company or at the police station to transfer the picture of the thief with information as to the number the thief was calling from. So as not to alert the thief, the portable communications device 1 can be programmed to play a busy signal while it is transferring data to the police.

In addition, the preferred embodiment envisions the use of a GPS receiver, incorporated into the portable communications device 1, to further enhance its ability to thwart theft. The data received by the GPS receiver from the global positioning satellite system can be appended to the data transmitted to the police such that police would have a current image of the thief as well as the thief's approximate location.

In FIG. 1B, an enlarged view of the keypad 2 is shown. In the preferred embodiment the keypad 2 includes the standard keys found on any telephone. In addition, several after keys are provided to turn the mode switch on and off, clear data entry and to provide menu control functions.

FIG. 2A–2D illustrate how the portable communications device 1 is converted from the folded cellular telephone configuration to the unfolded headset configuration.

Figure 2A:
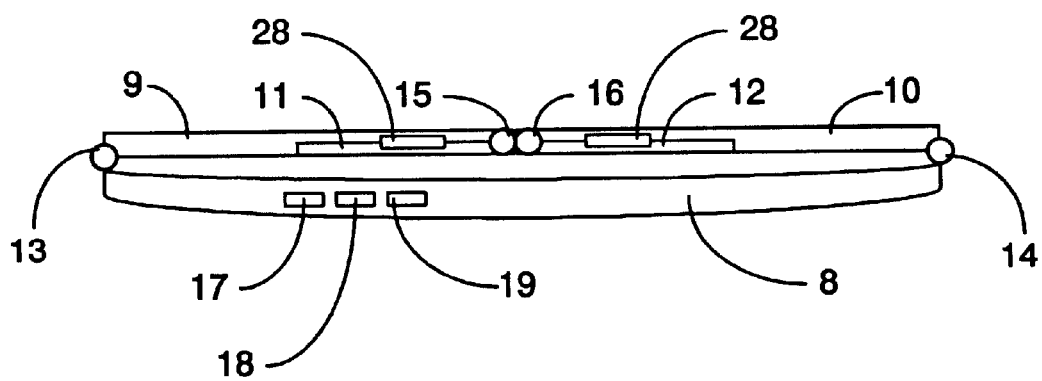
FIG. 2A is a side view of the embodiment of FIG. 1A which shows the upper and lower segments of the device attached via hinges to the base segment and folded into the cellular telephone configuration.

FIG. 2A is a side view of the embodiment of FIG. 1A. In this figure, the base segment 8 is shown attached to the lower segment 10 via lower hinge 14. The upper segment 9 is shown attached to the other end of the base segment 8 via upper hinge 13. The upper wing 11 is attached to the upper segment 9 via upper wing hinge 15. The lower wing 12 is shown attached to the lower segment 10 via lower wing hinge 16. As can be seen, this configuration results in the portable communications device 1 having the same general configuration as a conventional cellular telephone. In addition, volume switches 17–18 are shown mounted on the side of base segment 8. In addition, a radio on/off switch 19 is also shown on the side of base segment 8.

This figure also illustrates an optional head pad 28 that is integrated with the portable communications device 1. In this figure, one optional head pad 28 is positioned between the upper segment 9 and the upper wing 11, at the second optional head pad 28 is positioned between the lower segment 10 at the lower wing 12 when the portable communications device 1 is in the closed position.

Figure 2B:
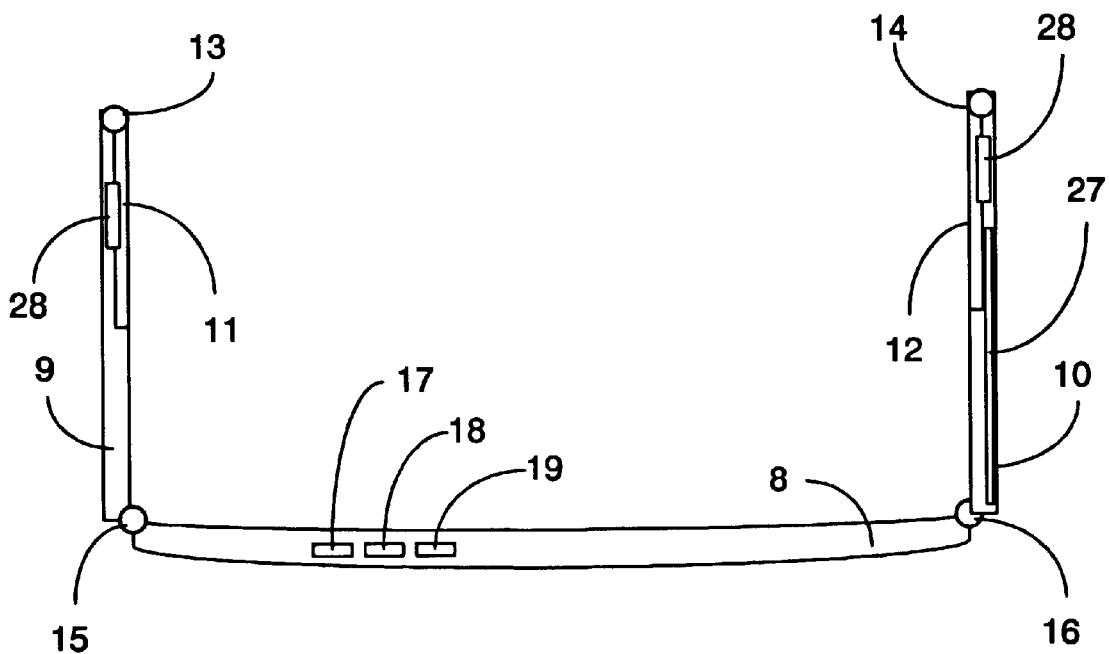
FIG. 2B is a side view of the embodiment of FIG. 2A in which the upper and lower segments of the device have been unfolded into the headset configuration. In this view, the upper and lower wings have not been unfolded and remain aligned with the upper and lower segments respectively. An optional boom microphone is also illustrated in this figure.

In FIG. 2B, the portable communications device 1 is shown in the partially unfolded configuration. In this configuration, the upper segment 9 has been unfolded, but the upper wing 11 is still folded against upper segment 8. Likewise, lower segment 10 is unfolded from base segment 8, but lower wing 12 still folded against lower segment 10.

Also shown in this figure is an optional boom microphone 27. This figure illustrates the boom microphone 27 folded into a cavity on the side of the telephone for storage when not in use. In addition to the optional boom microphone 27, the optional head pads 28, which were discussed above, are also illustrated.

Figure 2C:
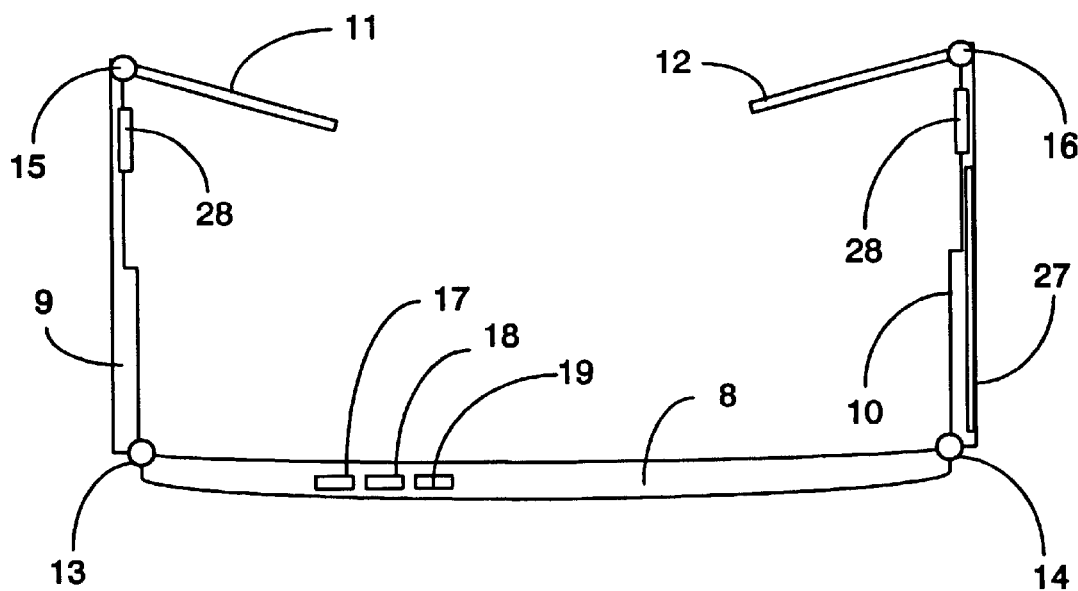
FIG. 2C is a side view of the embodiment of FIG. 2A in which the upper and lower segments of the device have been unfolded into the headset configuration. In this view, the upper and lower wings have been partially unfolded away from the upper and lower segments.

FIG. 2C illustrates the next step in the conversion process. In this figure the upper wing 11 and the lower wing 12 are partially unfolded from upper segment 9 and lower segment 10 respectively. In addition to the optional boom microphone 27, the optional head pads 28, which were discussed above, are also illustrated.

Figure 2D:
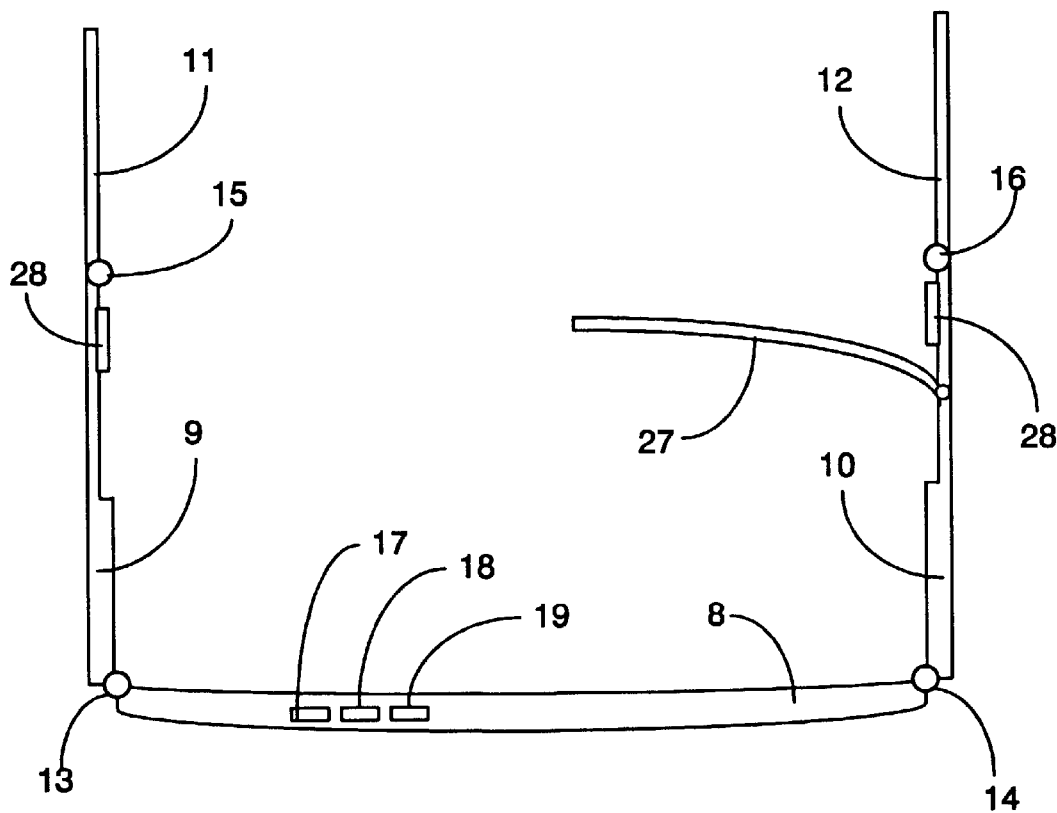
FIG. 2D is a side view of the embodiment of FIG. 2A in which the upper and lower segments of the device have been unfolded into the headset configuration, and the upper and lower wings have also been fully unfolded into the headset configuration. An optional boom microphone is also illustrated in this figure.

FIG. 2D illustrates the final step in the process wherein the upper wing 11 has been completely unfolded from upper segment 9, and lower wing 12 has been completely unfolded from lower segment 10. This figure also illustrates the optional boom microphone 27 extended from the lower segment 10 when the portable communications device 1 is unfolded into the headset configuration. This allows hands free use of the device when the user is engaging in other activities such as jogging. In the preferred embodiment, boom microphone is envisioned as being a rigid arm hingedly attached to the body of the portable communications device 1. However, this also possible to implement the microphone 27 as a flexible boom which would allow the microphone 27 to be more easily adjusted to an individual user's head size.

The optional head pads 28, discussed above, are shown. In the unfolded position, the head pads 28 provide comfort to the users head when the portable communications device 1 is unfolded into the headset position.

The preferred embodiment of the invention envisions the portable communications device 1 being used as a cellular telephone in the folded position and as an entertainment device, such as a headset radio, in the unfolded position. However, the addition of the optional boom microphone 27 allows the portable communications device 1 to also be used as a headset telephone which allows hands free use while the user is engaging in other activities.

Figure 3A:
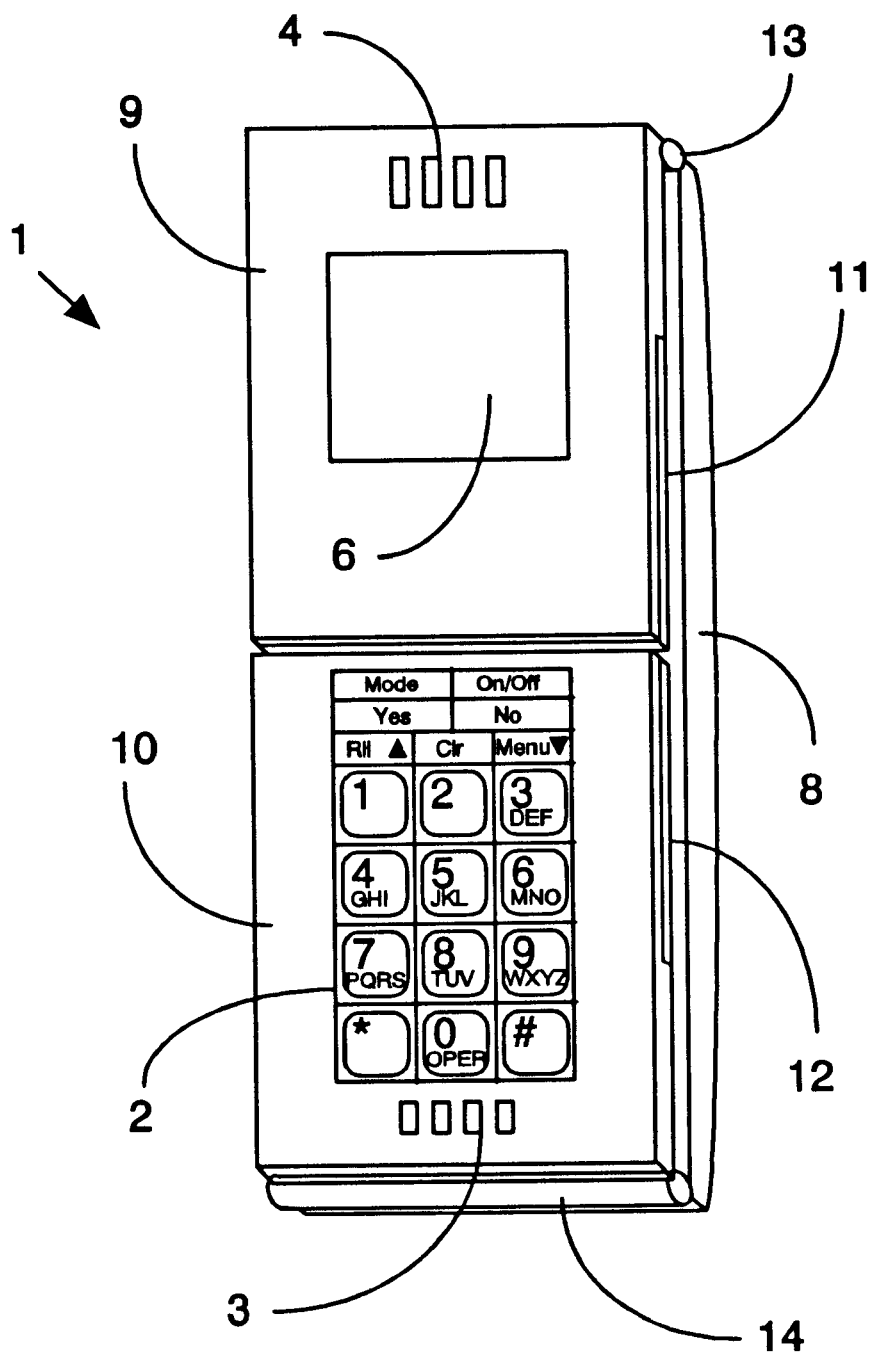
FIG. 3A is a perspective view that illustrates an alternative preferred embodiment in which the antenna has been retracted to allow the device to be unfolded and used as a portable terminal for teleconferencing use, video speaker phone use, or for audio/video input and output for a computer network such as the Internet.

FIG. 3A illustrates the portable communications device 1 with the antenna 5 retracted prior to conversion from the folded to the unfolded position for use as a terminal or video phone station.

Figure 3B:
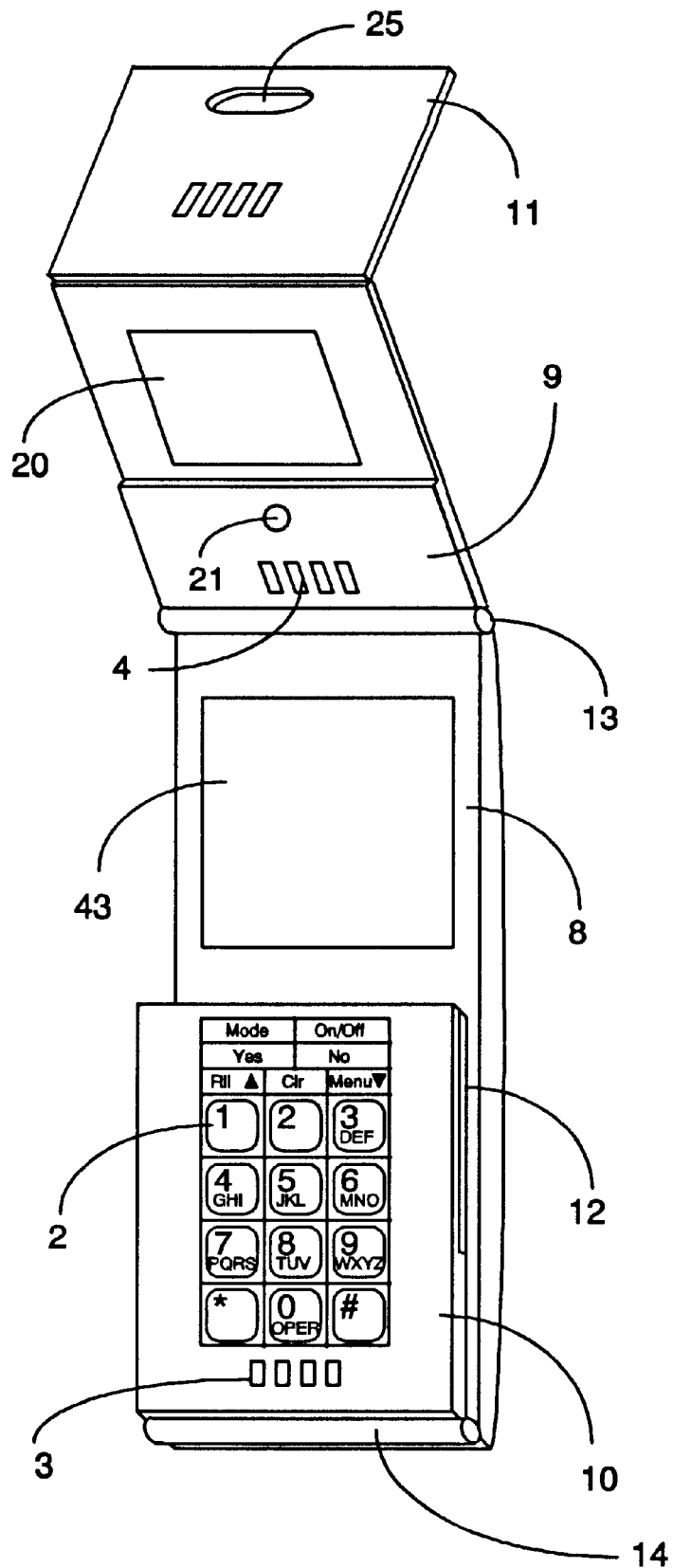
FIG. 3B is a perspective view of the embodiment of FIG. 3A in which the upper segment has been unfolded and the upper wing has been folded back to support the upper segment and used as a video or computer terminal. In this view the lower segment remains folded to provide access to the keypad.

FIG. 3B is a perspective view which illustrates a preferred embodiment in which the portable communications device 1 is unfolded into a video phone or computer terminal configuration. In this configuration, the lower segment 10 remains in the folded position so that the user can access the keypad 2. Likewise, the microphone 3 is also accessible from this position. The upper segment 9 is unfolded to allow viewing of a second active matrix screen 20. The upper wing 11 is folded back and used to provide support for the upper segment 9 by resting against the surface where the portable communications device 1 is placed. Those skilled in the art will recognize that the portable communications device can also be constructed such that the display 6 is fabricated with a less expensive LCD display which is useful for a conventional cellular telephone while an active matrix display can be placed on the opposite side and used as a video phone device or as a terminal for a computer. In addition, a second camera 21 is shown in this figure to allow the portable communications device 1 to be used as a full function video phone.

Also shown in this figure is optional touch pad 43. For users intending to use the portable communications device 1 as both a cellular telephone and a data terminal, the optional touch pad 43 may be a useful pointing device for menu items displayed on display 20. The addition of the optional touch pad 43 also allows the device to be used as a fully configured data terminal in conjunction with the keypad, display, video, and audio functions.

Those skilled in the art will also notice that the upper wing hinge 13 has been eliminated and replaced with a less expensive living hinge. Likewise, some of the redundant elements such as the displays 6, 20 and the camera 7, 21 can be eliminated to reduce costs and complexity.

Also shown in this figure is aperture 25 in upper wing 11 which can be used in conjunction with another aperture 25 and the lower wing 12 to attach a strap 26 (shown in FIG.

5) for the purpose of securing the portable communications device 1 to the users head when the user is engaging in strenuous activities such as jogging. This optional feature is also illustrated below in regard to FIG. 5.

Figure 4A:
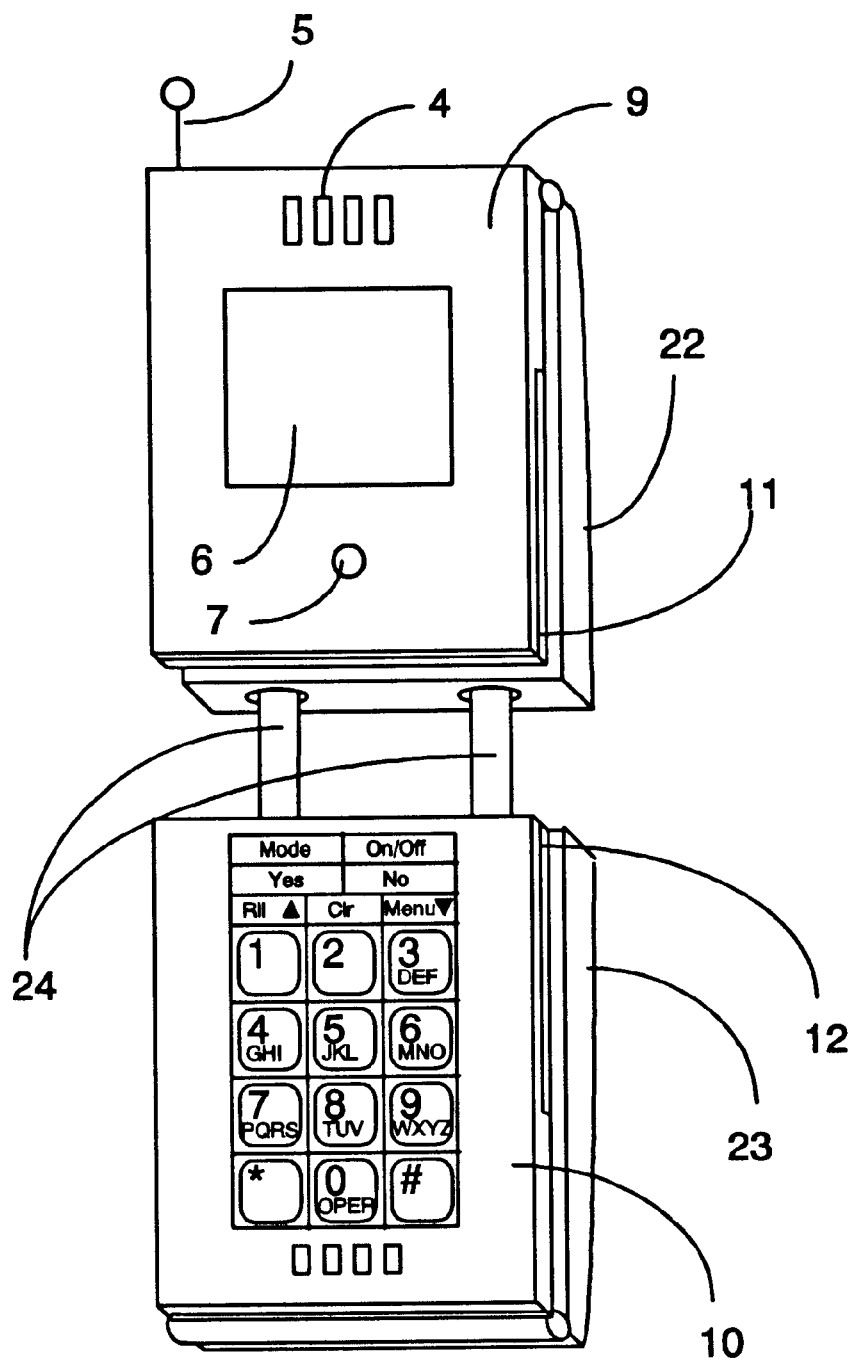
FIG. 4A is an alternative preferred embodiment in which the base segment is split into two separate pieces which are connected by extension rods that allows the device to be adjusted to accommodate the size of the wearer when worn as a portable headset.

FIG. 4A is an alternative embodiment in which the base segment 8 is split into an upper base segment 22 and lower base segment 23. By splitting the base segment in this manner extension rods 24 can be used to extend the upper base segment 22 from the lower base segment 23 such that the size of the portable communications device 1 can be adjusted to fit an individual user. In the preferred embodiment, the rods 24 can be mounted such that they are held in place by frictional force.

Figure 4B:
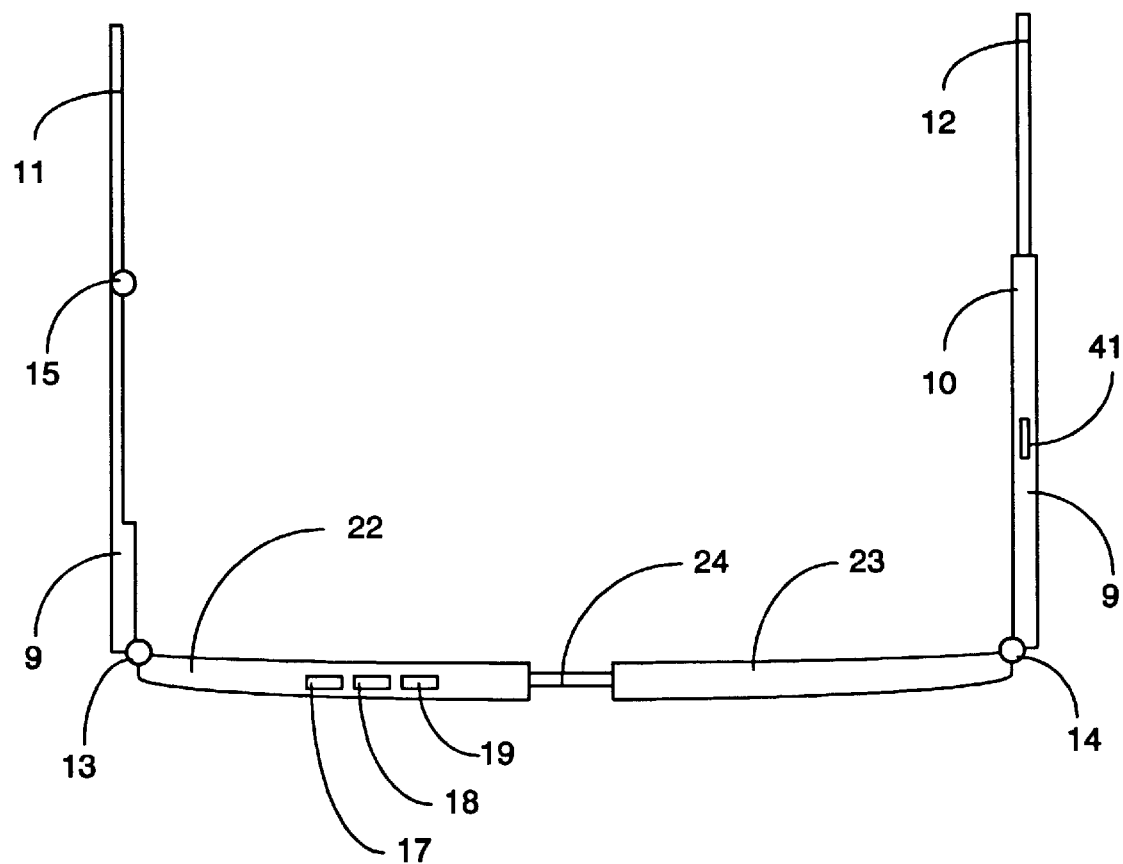
FIG. 4B is a side view of the embodiment of FIG. 4A which shows the base segment separated by the extension rods and the upper and lower base segments in the unfolded position. In addition, the upper wing is attached via a hinge while the lower wing is illustrated as being attached via a retractable slide mechanism.

FIG. 4B is a side view of the embodiment of FIG. 4A which shows the upper base segment 22 and lower base segment 23 extended away from one another and connected by rods 24. Of course, those skilled in the art will recognize that many alternative devices can be used to extend upper base segment 22 from lower base segment 23. Therefore, the use of frictional rods 24 should be considered a design choice and only one of numerous alternate extension-methods that could be used.

Also shown in this figure is an alternative embodiment of lower wing 12. In this embodiment, the lower wing 12 is not hingedly attached to lower segment 9. Rather, it is a retractable device which is spring loaded retracted into lower segment 9 when not in use. When retracted, it is held in the retracted position via an internal latch (not shown). When the user wants to extend the lower wing 12, the user presses release button 41 which releases the latch. When the latch is released, the internal spring (not shown) automatically extends lower wing 12. For ease of illustration, upper wing 11 is shown in the hinged configuration. However, those skilled in the art will recognize that either the upper wing 11, or the lower wing 12, or both can be implemented in either a hinged or a retractable configuration.

Figure 5:
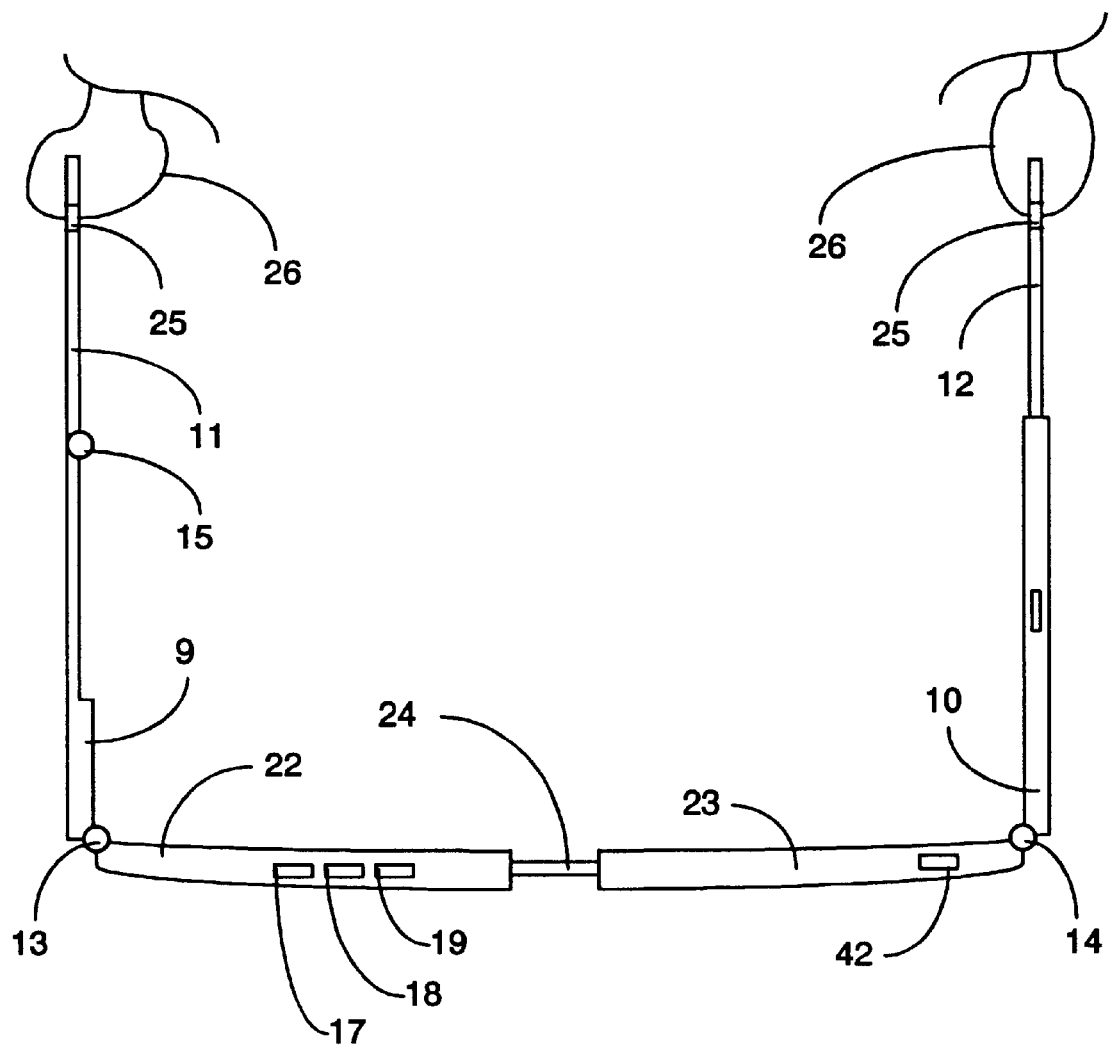
FIG. 5 illustrates another alternative embodiment in which temperatures are provided in the device to accommodate attachment of a strap which is used to hold the device to the user's head while the user engages in strenuous activities such as jogging.
Figure 6:
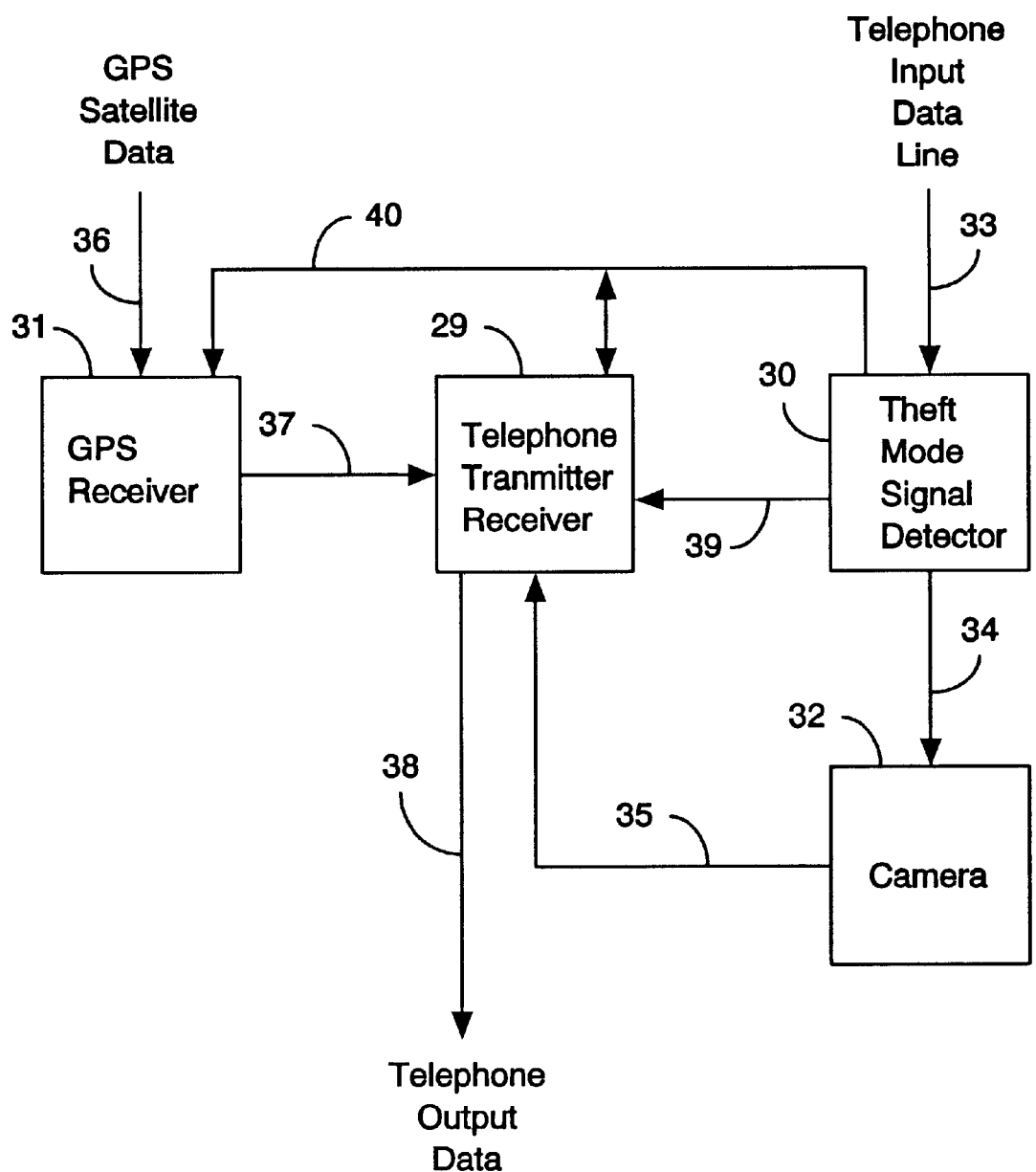
FIG. 6 is a block diagram that illustrates a preferred embodiment of the theft prevention system embodied in this invention.

FIG. 5 illustrates another alternative embodiment in which apertures 25 are placed in the upper wing 11 and the lower wing 12. A strap 26 is inserted through the apertures 25 and used to secure portable communications device 1 to the head of the user. This optional feature prevents accidental dropping or loss of the portable communications device 1 when the user is engaging in strenuous activity. Also shown in this figure is a manual control switch 42 which allows the user to manually switch between telephone and radio modes of operation, or if call waiting as an option activated on the telephone, manual control switch 42 can also be used to switch between telephone calls. In the preferred embodiment, manual control switch 42 is located away from the other switches on the device to reduce the possibility that the user will accidentally activate a different In FIG. 6, a block diagram of the preferred embodiment of the antitheft system incorporated in the invention is illustrated. Due to the small size of cellular telephones, they are attractive targets for thieves. While the integration of video into a conventional cellular telephone, as shown by this invention, is a highly desirable feature, it also increases the likelihood of the device will be stolen due to its increased capability and value. The antitheft function illustrated by FIG. 6 reduces the possibility that this device will be attractive to a thief.

In this embodiment, the telephone input data line 33 receives a normal telephone input signal, but instead of routing it directly to the telephone transmitter receiver 29 it is first routed to a theft mode signal detector 30. The theft mode signal detector passively analyzes the data received by the telephone to see if a theft mode activation signal is present. The telephone data signal is passed through the theft mode signal detector 30 to the telephone transmitter receiver via data line 39. If the telephone is stolen, the user can notify the telephone company who can then transmit a signal to the user's telephone to activate the theft mode signal detector. If the theft mode signal detector 30 recognizes a theft alert signal from the telephone company, it can activate antitheft functions such as GPS transmission and also activate the camera silently without ringing the telephone or alerting the thief in any manner. In addition, the microphone can also be activated then transmit conversations of the thief without alerting the thief.

Alternatively, the telephone company can silently transmit a signal to the theft mode signal detector 30 that will automatically activate the GPS receiver 31 as well as the camera 32 as soon as the telephone number begins to be entered via the keypad 2. The advantage of activating the camera in this manner is that while the thief is entering the telephone number via keypad 2, the camera will be pointing directly at the thief.

For example, the telephone company can silently activate the antitheft function and then passively wait for the thief to attempt to place a telephone call. The theft mode signal would be transmitted via the telephone by the telephone company to theft mode signal detector 30. The theft mode signal detector 30 would then notify telephone transmitter receiver 29 via control line 40. As soon as the thief attempts to place an outgoing call, the telephone transmitter receiver 29 can silently activate the GPS receiver 31 and the theft mode signal detector 30. Theft mode signal detector 30 would then activate camera 32 via control line 34. Camera 32 would then began recording video data and inputting that data to telephone transmitter receiver 29. The telephone transmitter receiver 29 would then begin transmission of video and GPS data to the telephone company and/or the police without alerting the thief.

During normal operation, incoming and outgoing calls would be routed from telephone input data line 33 through the theft mode signal connector 30 and output on line 39 to the telephone transmitter receiver 29. The user would then transmit responses as telephone output data along line 38. In this situation, the telephone would act as any normal telephone.

Figure 7:
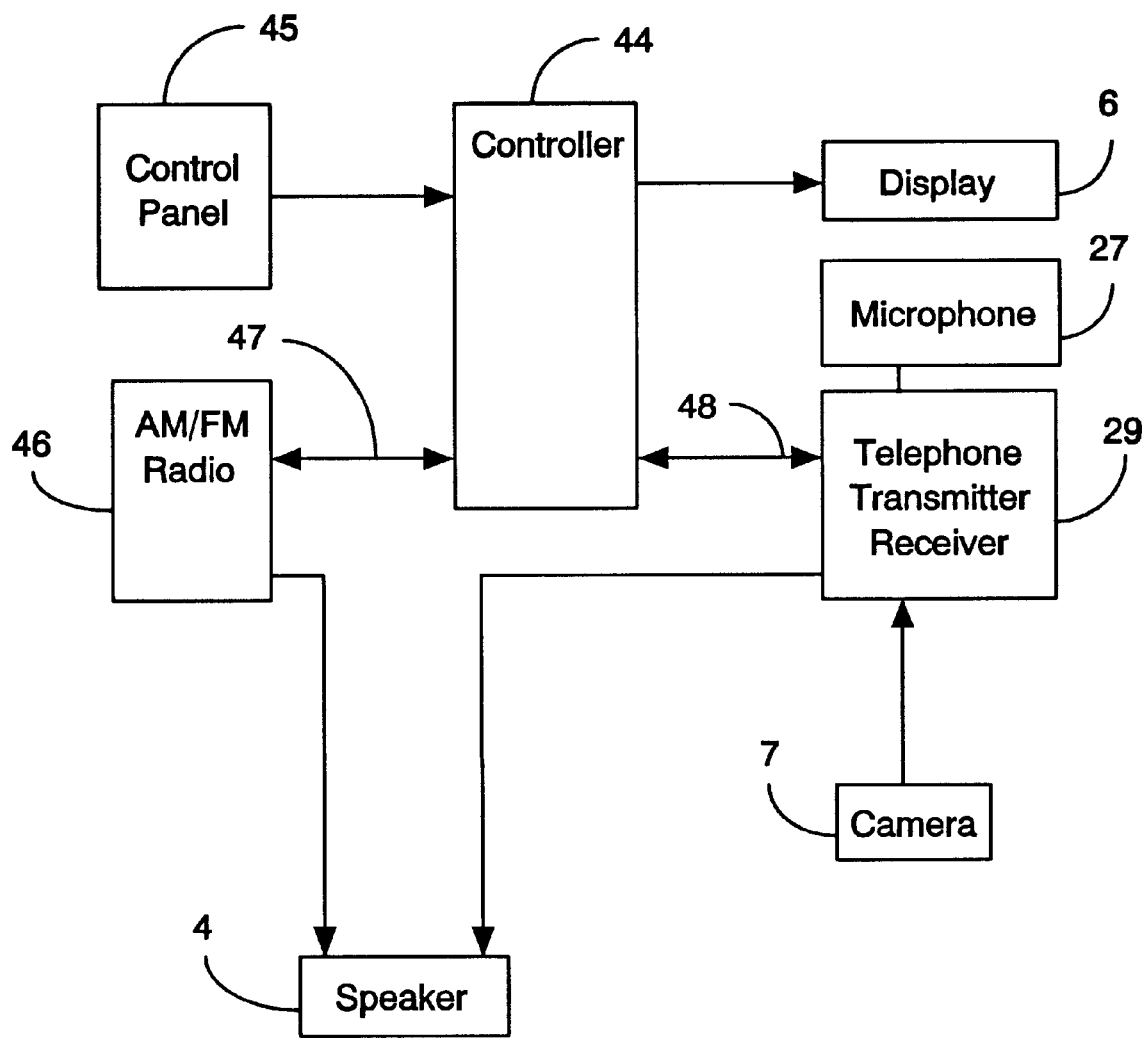
FIG. 7 as a block diagram that illustrates how the portable communications device controls the system components such as the telephone and radio functions.

FIG. 7 shows a block diagram of a preferred embodiment of the portable communications device 1. This figure illustrates how interaction of components such as the telephone function and the radio function may be controlled. In this embodiment, the controller 44 is a low power controller such as an Intel 80C5x series controller. It receives commands and information from the operator controls 45. In practice, the operator controls 45 would be implemented by keypad 2, manual switches 17–19, 42, etc. The controller 44 controls the activation of functions such as AM/FM radio, volume control, activation of the telephone, etc. The display 6 is used by the controller 44 to display status information such as current radio frequency, telephone number, caller ID, signal strength, battery status, and so on.

Audio output is controlled as follows. A device such as an AM/FM radio module 46 is connected to the controller 44 via bus 47. This bus 47 is used by controller 44 to control functions in the radio module 46 such as radio frequency, volume, etc. When the AM/FM radio module is active, the audio output of the AM/FM radio module 46 is input to speaker 4 under control of controller 44. In the preferred embodiment, when a telephone call is initiated, the controller 44 pauses operation of the AM/FM radio module 46, and activates telephone transmitter receiver 29. Telephone transmitter receiver 29 outputs its audio data to speaker 4 under control of controller 44 via bus 48. Telephone transmitter receiver 29 also inputs audio data from microphone 27. Camera 32 is used for video input when the portable communications device 1 is used as a video phone. For ease of illustration, the input signal line between the telephone company and the telephone transmitter receiver is not shown.

An additional feature that can be implemented by the AM/FM radio function and added as a modular feature is a recording identification function which identifies and retrieves specific music selections when they are broadcasted. Systems which provide embedded identification codes that describe the nature of broadcast work, such as the artist name and/or title of the work, etc. are well known in the arts. The systems are typically used for billing purposes. For example, the radio station automatically tracks the songs that are broadcasted to ensure that the artist is properly compensated for the use of their copyrighted material. In the preferred embodiment, the identification codes are stored when received.

The purpose of the recording identification function is to allow listeners to automatically identify particular selections that the listener wants to hear again. When a listener hears a particular musical selection, the listener may activate the recording identification function by pressing a select button while the musical selection is playing. Since the identification code was previously recorded at the start of the musical selection, when the listener activates the select button, the recording identification function within begins a scanning function that scans radio stations after the selected musical work is completed. A scanning function scans radio stations searching for the particular musical work. When that work is detected, the AM/FM radio is tuned to that station so the listener may hear the selected musical work again. In the preferred embodiment, sufficient storage will be provided to store identification information for more than one musical selection.

In the preferred embodiment, the recording identification function may have a plurality of tuners: one active tuner is used to manually select a specific radio station, the other tuners are scanning tuners that will constantly employ seek and scan technology to search and identify broadcasted music selections that the user has chosen and recorded into memory. The scanning tuners are mute and do not input audio data to the speakers. The manual tuner always inputs audio data to the speakers. When one of the scanning tuners detects the selected musical work, the system may switch the active tuner to the frequency of the scanning tuner and switch the frequency of scanning tuner to the original frequency of the active tuner. Likewise, the active tuner can be tuned to the frequency of the scanning tuner and the scanning tuner can then be tuned to a new frequency. Both tuners may have a separate on/off switch. In the preferred embodiment, the scanning tuner can automatically interrupt the system to play the scanned for selection when detected.

Users program the recording identification function by recording music identification codes directly from the radio (or other device such as a CD or tape). Music identification codes may be recorded and stored in digital format in a variety of ways. For example, it may be stored by the name of the artist, by the title of the selection, by album title, etc. When a selection is stored, the system will use the artist and title code to detect when a selection goes on and off the air. The artist and title code will trigger an alert signal that will be active for as long as the selection is on the air. An alert signal will let the user know when a selection goes on the air, but it will not detect when it goes off Storage may be employed to list a plurality of selections. Each time a new selection is recorded, the system will compare it with memory selections that have been stored at each memory address. If a selection is recorded and it contains data that is unique, it will be stored at the next available address. Duplicate selection identification information will not be stored. When memory is full and the user records a new selection, the selection that has played the most will be deleted first. The system will count each time a selection plays.

If the user duplicates the recording of a music selection, it can be handled in a variety of ways. For example:

1) If a selection is stored by artist and title code, and a duplicate record is recorded by artist and title code, the new record will cancel the old one and the play counter returns to zero.
2) If a selection is stored by artist and title code, and a duplicate record is recorded by artist and title code, the old record will cancel the new one and the play counter remains the same.

Once a selection has been stored, the seek and scan tuner will search and compare data in memory with transmitted broadcast data. When the selection is detected, the system will alert the user that a memorized selection is on the air. The user may then decide to ignore the signal, or activate a station switch operation via a manual switch to tune the AM/FM radio to the new frequency.

When ever a memory selection is on the air, the frequency broadcasting it will be placed in temporary storage. If the user is tuned into a frequency on which a memory selection begins to play, a copy of the frequency will be placed in temporary storage (in this case, the manual tuner and the seek and scan tuner will operate simultaneously).

When the user is tuned into one frequency, and the recording identification function identifies a memory selection on a different frequency, a frequency alert (beep) will be emitted, and the user may switch to the new frequency located in temporary storage.

When the user is already listening to a memory selection, and additional memory selections are detected, a flashing light alert will indicate to the user that more selections are available. The user may remain at the current frequency, or loop around temporary storage by issuing the "play" command. Several frequencies can be held in temporary storage. Each frequency that enters temporary storage will be retained in a specified (e.g. chronological or preferential) order. When temporary storage is full, the oldest (or least preferred) frequency will be deleted when a new one is added. The "stop" command retrieves the frequency on the manual tuner.

The user may choose to manually retrieve and recall frequencies, or allow the recording identification function to automatically do it. When the automatic retrieval and recall function is on, the system will emit a rapid beep 5 seconds before the frequency change. If the user is hearing important information, the frequency change can be aborted by pressing "stop." If more than one frequency containing memory selections is identified, the automatic retrieval function will choose only one frequency and will not automatically change to the next one. However, a flashing indicator light will let the user know that additional memory selections are on the air. Since the system will not detect when a recording goes off the air, the user can press stop to recall the frequency on the manual tuner, otherwise the system will recall it after a predetermined time period.

The recording identification function may be implemented in several embodiments. For example, it may be used in conjunction with portable communications device 1, or with other devices. For example, it can also be implemented for use with automobile radios, home stereos, portable stereos, etc.

Those skilled in the art will realize that the number of functions provided by this portable communications device 1 may be more than a particular user requires if the portable communications device 1 is fully configured. Further, the cost of a fully configured portable communications device 1 would certainly be more expensive than a device in which features were selectable due to a modular construction. In the preferred embodiment various components of the system, such has the upper segment 9, the lower segment 10, the upper wing 11, the lower wing 12, and the base segment 8 are intended to be modular components which can be disconnected via hinges 13–16. As a result, a user who does not wish to use an AM/FM radio function can substitute the modular portion of the device that holds that function with a substitute module that holds a different function or no function. Likewise, those who do not intend to use the portable communications device 1 as a data terminal, but want an AM/FM radio, can eliminate functions such as optional touch pad 43, optional display 20, and optional video camera 21, can replace them with the AM/FM radio function. As a result, the ability to replace modular components allows the user to configure the most cost-effective device. Further, the modularity also facilitates maintenance by allowing the replacement of defective components without having to replace the entire portable communications device 1.

Those skilled in the art will recognize that some of the functions described herein can be implemented in hardware or software. However, the preferred embodiment uses software implementation, where possible, because software provides a more inexpensive and easily modifiable method of implementing the many functions the device is capable of performing. Likewise, the preferred embodiment envisions modular units which allow easier maintenance, convenient selection of desired features, and easy expandability.

While the invention has been described with respect to a preferred embodiment thereof, it will be understood by those skilled in the art that various changes in detail may be made therein without departing from the spirit, scope, and teaching of the invention. For example, the functions used by the device can be implemented in hardware, firmware, or software; functions can be fixed or modular in nature; the display technology discussed can be replaced with any suitable display technology. Accordingly, the invention herein disclosed is to be limited only as specified in the following claims.

We claim:

1. A portable communications device, comprising:
    a telephone transmitter/receiver, the telephone transmitter/receiver further comprising:
        means to transmit telephone data;
        means to receive telephone data;
        a speaker;
        a microphone;
    a keypad for entering data;
    a base segment having a lower hinge and an upper hinge;
    an upper segment attached to the upper hinge, the upper segment hingedly attached to the upper hinge such that it can be folded substantially against the base segment in a folded position or unfolded in an unfolded position such that it extends outward from the base segment at a preselected angle;
    a lower segment attached to the lower hinge, the lower segment hingedly attached to the lower hinge such that it can be folded substantially against the base segment in a folded position or unfolded in an unfolded position such that it extends outward from the base segment at a preselected angle;
    the lower segment and the upper segment sized such that when they are in the folded position, the upper segment, the lower segment, and the base segment collectively are shaped in the form of a cellular telephone handset; and
    the lower segment and the upper segment further sized such that when they are in the unfolded position, the upper segment, the lower segment, and the base segment collectively are shaped in the form of a telephone headset;
    whereby the portable communications device can be converted from a handheld telephone into a telephone headset.

2. A device, as in claim 1, wherein the speaker volume and the microphone sensitivity are sufficient to allow use as a speaker phone.

3. A device, as in claim 1, further comprising:
    a radio receiver;
    means to activate the radio and deactivate the telephone transmitter/receiver such that the speaker is used to output broadcast radio audio data; and
    means to activate the telephone transmitter/receiver and deactivate the radio such that the speaker is used to output audio data;
    whereby the device can be used as a telephone or a radio receiver.

4. A device, as in claim 3, further comprising:
    the radio receiver further comprises at least an active tuner and a scanning tuner;
    means to input to the speaker the audio data output by the active tuner;
    means to receive broadcasted recording identification information in the scanning tuner;
    means to compare the received broadcasted recording identification information with preselected recording identification information; and
    means to tune the active tuner to the frequency used by the scanning tuner when the received broadcasted recording identification information and the preselected recording identification information match;
    whereby the radio can be automatically switched to a station playing a desired recording.

5. A device, as in claim 1, further comprising:
    a camera, the camera providing video data for transmission with telephone audio data;
    means to receive video data as a component of video phone data;
    a display, the display capable of displaying the video data;
    whereby the device can be used as a videophone.

6. A device, as in claim 5, further comprising:
    an antitheft function, further comprising:
        means to receive commands from a remote location;
        means to activate the camera under control of a command received from the remote location; and
        means to transmit video data output by the camera to the remote location;
    whereby the camera can be activated remotely to transmit video data if the device is stolen.

7. A device, as in claim 6, further comprising:
    a GPS receiver, the GPS receiver having means to determine the location of the device from received global positioning data;
    means to activate the GPS receiver under control of a command received from the remote location; and
    means to transmit location data indicating the location of the device output to the remote location;
    whereby the GPS receiver can be activated remotely to transmit location data if the device is stolen.

8. A device, as in claim 7, wherein the video data and location data are transmitted without alerting the user by indicating any activity;
    whereby the video and location data can be transmitted to a remote location if the device is stolen without alerting the thief.

9. A device, as in claim 1, further comprising:
    an upper wing, the upper wing foldably attached to the upper segment such that it has a folded position in which it is substantially adjacent to the upper segment, and an unfolded position in which it extends from the end of the upper segment; and a lower wing, the lower wing foldably attached to the lower segment such that it has a folded position in which it is substantially adjacent to the lower segment, and an unfolded position in which it extends from the end of the lower segment.

10. A device, as in claim 9, wherein the upper wing has a terminal position in which it is hingedly folded behind the upper segment such that when the base segment if laid flat on a surface, the upper segment will be angled upward from the surface for viewing in a computer terminal configuration.

11. A device, as in claim 10, further comprising:

means to transmit and recieve computer data to a remote computer via the telephone transmitter/receiver;

a touch pad, the touch pad having means to input position data to the device;

whereby the device can be used as a computer terminal.

12. A device, as in claim 11, further comprising:

a second display, the second display located on the upper segment such that it is visible when the device is in the computer terminal configuration;

a second camera, the second camera located on the upper segment such that it is visible when the device is in the computer terminal configuration;

the touch pad located on the base segment such that it is visible when the device is in the computer terminal configuration.

13. A device, as in claim 9, wherein the upper segment is attached to the upper wing via a hinge and the lower segment is attached to the lower wing via a hinge.

14. A device, as in claim 9, wherein the upper segment is retractably attached to the upper wing and the lower segment is retractably attached to the lower wing.

15. A device, as in claim 9, further comprising:

a boom microphone, the boom microphone having a closed position in which it is folded against the device, and an open position in which it is unfolded to extend out from the device;

the microphone further positioned such that when the device is in the unfolded position and worn as a headset, and the microphone is in the open position, the microphone is sufficiently close to the wearer's mouth to detect sounds uttered by the wearer.

16. A radio, further comprising:

a speaker;

a radio receiver having at least an active tuner and a scanning tuner;

means to input to the speaker the audio data output by the active tuner;

means to receive broadcasted recording identification information in the scanning tuner, the broadcasted recording identification information transmitted with individual recorded works and containing information associated with that particular recorded work;

means to compare the received broadcasted recording identification information with preselected recording identification information, the preselected recording identification information further comprising a list of one or more recorded works; and means to tune the active tuner to the frequency used by the scanning tuner when the received broadcasted recording identification information, when compared with the preselected recording identification information, indicates that a particular recorded work is being broadcast that is listed in the preselected recording identification information;

whereby the radio can be automatically switched to a station playing an individual recorded work which has been identified as a desired recording.

17. A radio, as in claim 16, further comprising:

a plurality of scanning tuners, at least two scanning tuners tuned to different scanning frequencies;

a plurality of preselected recording identifications;

whereby multiple desired recordings can be searched for at the same time.

18. A video telephone, comprising:

a telephone transmitter/receiver, the telephone transmitter/receiver further comprising:
means to transmit telephone data;
means to receive telephone data;
a speaker;
a microphone;

a keypad for entering data;

a camera, the camera providing video data for transmission with telephone audio data;

means to receive video data as a component of video phone data;

a display, the display capable of displaying the video data;

an antitheft function, further comprising:
means to receive commands from a remote location;
means to activate the camera under control of a command received from the remote location; and
means to transmit video data output by the camera to the remote location;

whereby the camera can be activated remotely to transmit video data if the device is stolen.

19. A device, as in claim 18, further comprising:

a GPS receiver, the GPS receiver having means to determine the location of the device from received global positioning data;

means to activate the GPS receiver under control of a command received from the remote location; and means to transmit location data indicating the location of the device output to the remote location;

whereby the GPS receiver can be activated remotely to transmit location data if the device is stolen.

20. A device, as in claim 19, wherein the video data and location data are transmitted without alerting the user by indicating any activity;

whereby the video and location data can be transmitted to a remote location if the device is stolen without alerting the thief.

* * * * *